(12) United States Patent
Kim

(10) Patent No.: US 11,464,380 B2
(45) Date of Patent: Oct. 11, 2022

(54) ARTIFICIAL INTELLIGENCE CLEANER AND OPERATING METHOD THEREOF

(71) Applicant: LG ELECTRONICS INC., Seoul (KR)

(72) Inventor: Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 466 days.

(21) Appl. No.: 16/727,516

(22) Filed: Dec. 26, 2019

(65) Prior Publication Data

US 2021/0161347 A1 Jun. 3, 2021

(30) Foreign Application Priority Data

Nov. 28, 2019 (KR) .................. 10-2019-0156053

(51) Int. Cl.
*A47L 9/28* (2006.01)
*G06N 3/08* (2006.01)
*A47L 9/24* (2006.01)
*G06V 40/12* (2022.01)

(52) U.S. Cl.
CPC .............. *A47L 9/2852* (2013.01); *A47L 9/244* (2013.01); *A47L 9/2857* (2013.01); *G06N 3/08* (2013.01); *G06V 40/12* (2022.01)

(58) Field of Classification Search
CPC ...... A47L 9/2852; A47L 9/244; A47L 9/2857; A47L 9/248; A47L 9/2805; A47L 9/2836; A47L 5/24; A47L 9/322; G06N 3/08; G06N 20/00; G06V 40/12; G06V 10/82; G06V 20/10; G06K 9/6272; G01L 9/00
See application file for complete search history.

(56) References Cited

U.S. PATENT DOCUMENTS

| | | | |
|---|---|---|---|
| 7,316,051 B2* | 1/2008 | Budd | A47L 5/34 15/361 |
| 2006/0000052 A1* | 1/2006 | Budd | A47L 5/34 15/361 |
| 2006/0085095 A1* | 4/2006 | Reindle | A47L 9/2821 700/258 |
| 2008/0284158 A1* | 11/2008 | Lin | A47L 9/244 285/7 |
| 2010/0123305 A1* | 5/2010 | Shih | A47L 9/244 285/7 |
| 2019/0099051 A1* | 4/2019 | Hird | A47L 9/02 |

FOREIGN PATENT DOCUMENTS

| | | | | |
|---|---|---|---|---|
| EP | 1955634 A2 * | 8/2008 | ............ | A47L 11/202 |
| ES | 2299500 T3 * | 6/2008 | ............ | A47L 9/0045 |

* cited by examiner

*Primary Examiner* — Joseph H Feild
*Assistant Examiner* — Rufus C Point
(74) *Attorney, Agent, or Firm* — Birch, Stewart, Kolasch & Birch, LLP

(57) ABSTRACT

An artificial intelligence cleaner may determine a length of a head from user cleaning information including a height of a user, a pressure sensing value applied to the head and a head angle between the head and the ground using a head length calculation model and control a head motor to have the determined length of the head.

16 Claims, 10 Drawing Sheets

| HEIGHT(cm) | GENDER | PRESSURE SENSING VALUE | ANGLE OF HEAD | LENGTH OF HEAD(cm) |
|---|---|---|---|---|
| 180 | MALE | 60 | 80 | 55 ~ 60 |
| 168 | FEMALE | 35 | 68 | 40 ~ 45 |
| 175 | MALE | 45 | 75 | 45 ~ 50 |
| 177 | MALE | 70 | 77 | 50 ~ 55 |
| 168 | 여 | 55 | 63 | 35 ~ 40 |

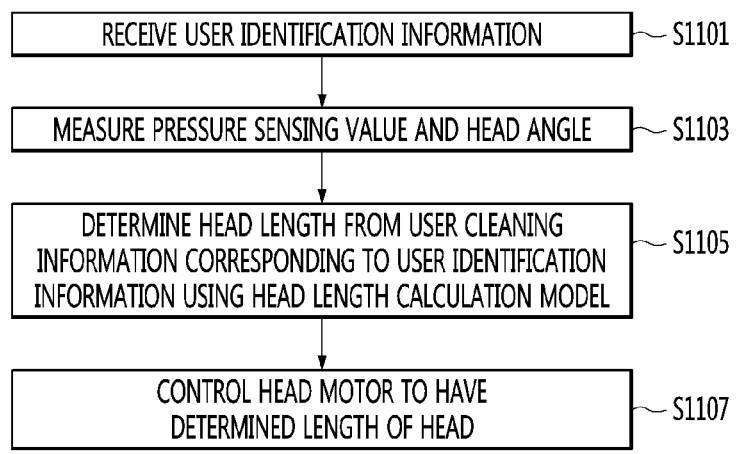

ARTIFICIAL INTELLIGENCE CLEANER AND OPERATING METHOD THEREOF

CROSS-REFERENCE TO RELATED APPLICATIONS

This application claims priority under 35 U.S.C. 119 and 365 to Korean Patent Application No. 10-2019-0156053, filed on 28 Nov. 2019, in the Korean Intellectual Property Office, the disclosure of which is incorporated herein by reference.

FIELD

The present disclosure relates to an artificial intelligence (AI) cleaner and, more particularly, to a handy stick AI cleaner.

BACKGROUND

A handy stick cleaner allows a user to clean a desired cleaning area via a handle.

A conventional handy stick cleaner used a method of allowing a user to manually increase or decrease the length of a head according to the height of the user and usability of the cleaner.

That is, the user needs to adjust the length of the head of the handy stick cleaner. However, the user who performs cleaning is not always the same and thus each user should adjust the length of the head of the handy stick cleaner.

Accordingly, each time the user is changed, the user should change the length of the head according to the height of the user and usability of the cleaner, thereby causing inconvenience.

That is, usability of the handy stick cleaner by multiple users may be impaired.

SUMMARY

An object of the present disclosure is to provide an artificial intelligence cleaner capable of automatically adjusting the length of a head according to the physical condition of a user.

Another object of the present disclosure is to provide an artificial intelligence cleaner capable of optimally adjusting the length of a head using a previously learned model even if a user is changed.

An artificial intelligence cleaner according to an embodiment of the present disclosure may determine a length of a head from user cleaning information including a height of a user, a pressure sensing value applied to the head and a head angle between the head and the ground using a head length calculation model and control a head motor to have the determined length of the head.

An artificial intelligence cleaner according to an embodiment of the present disclosure may determine a length of a head from user cleaning information using a head length calculation model learned via supervised learning.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 11 is a flowchart illustrating a method of operating an artificial intelligence device according to another embodiment of the present disclosure;

FIG. 12 is a view illustrating a head length table in which head lengths respectively match a plurality of users.

DETAILED DESCRIPTION

<Artificial Intelligence (AI)>

Figure 1:
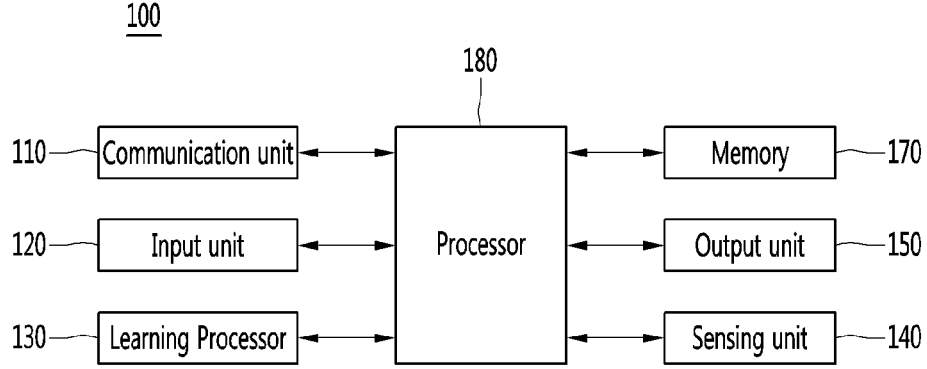
FIG. 1 illustrates an AI device according to an embodiment of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined path, and a technology for automatically setting and traveling a path if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing device 140, an output device 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
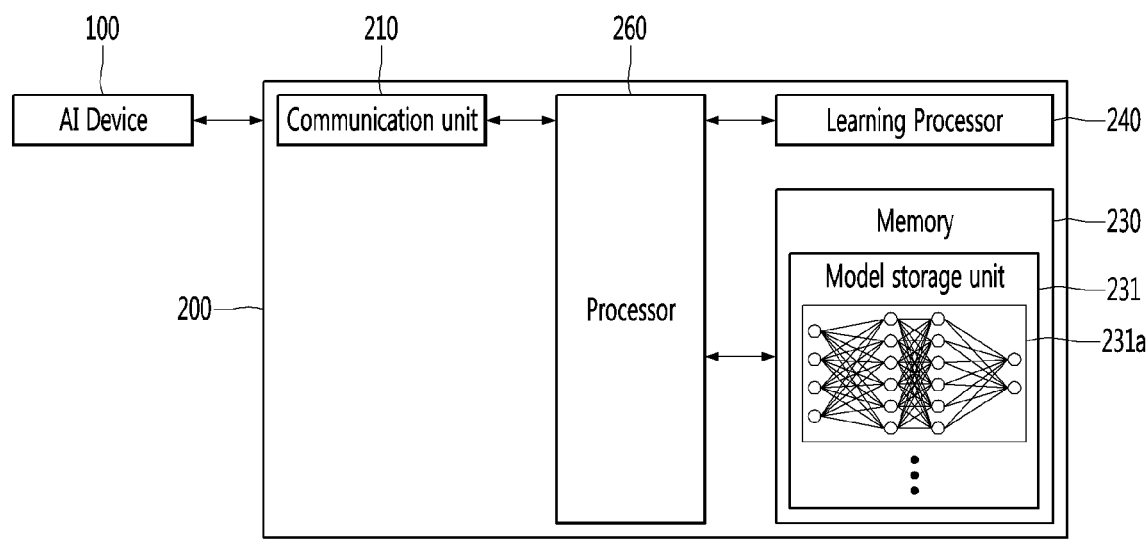
FIG. 2 illustrates an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
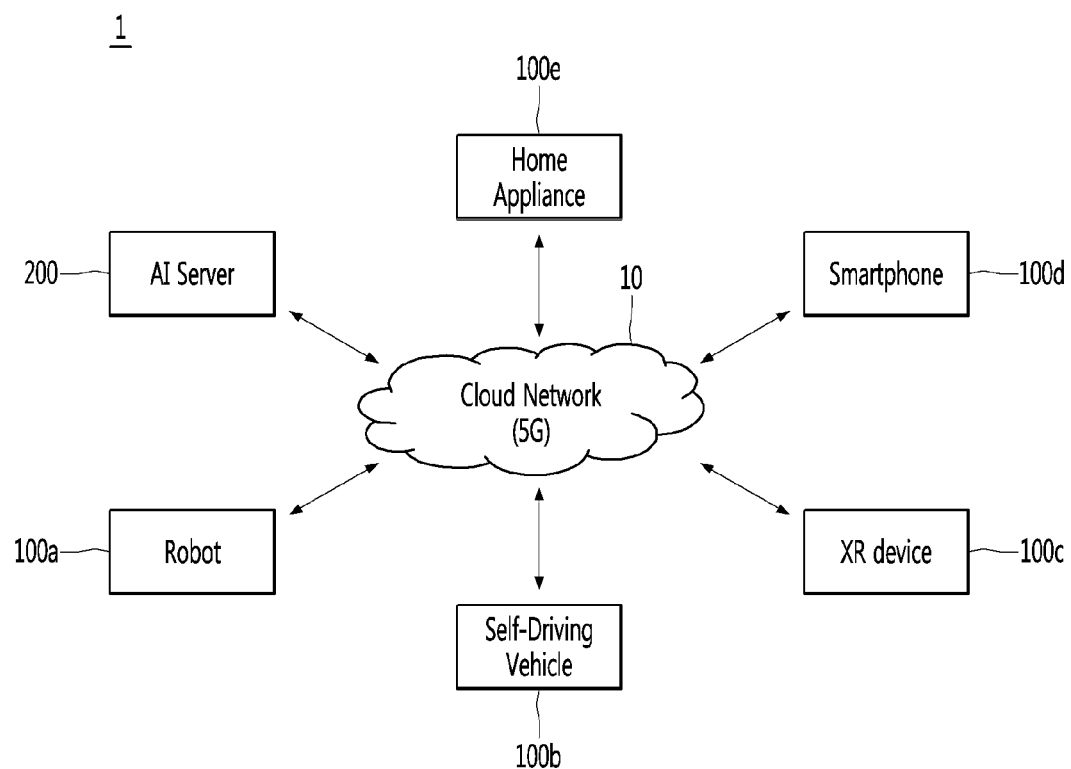
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the path and the travel plan, may determine the response to user interaction, or may determine the operation.

The robot 100a may use the sensor information acquired from at least one sensor among the lidar, the radar, and the camera so as to determine the travel path and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

In this case, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel path and the travel plan, and may control the driving device such that the robot 100a travels along the determined travel path and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. In this case, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel path or the travel plan. For example, the robot 100a and the self-driving vehicle 100b having the self-driving function may determine at least one of the travel path or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

In this case, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, if it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot In other words subjected to control/interaction in an XR image. In this case, the robot 100a may be separated from the XR device 100c and interwork with each other.

If the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user may confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving vehicle 100b, to which the XR technology is applied, may refer to a self-driving vehicle having a means for providing an XR image or a self-driving vehicle In other words subjected to control/interaction in an XR image. Particularly, the self-driving vehicle 100b In other words subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

If the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
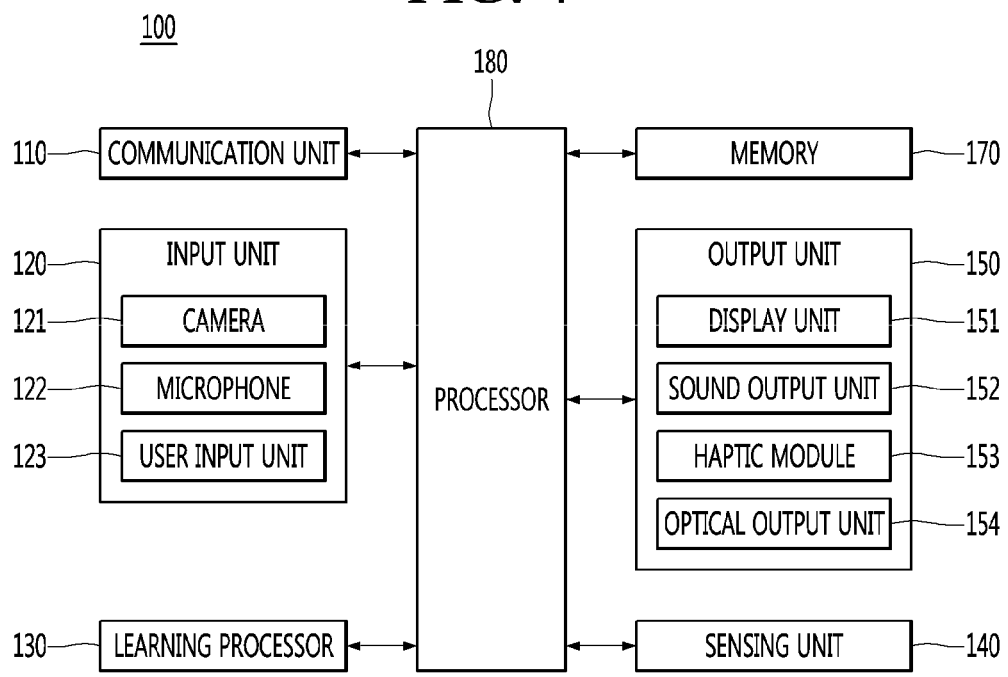
FIG. 4 illustrates an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and if information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output device 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

Figure 5:
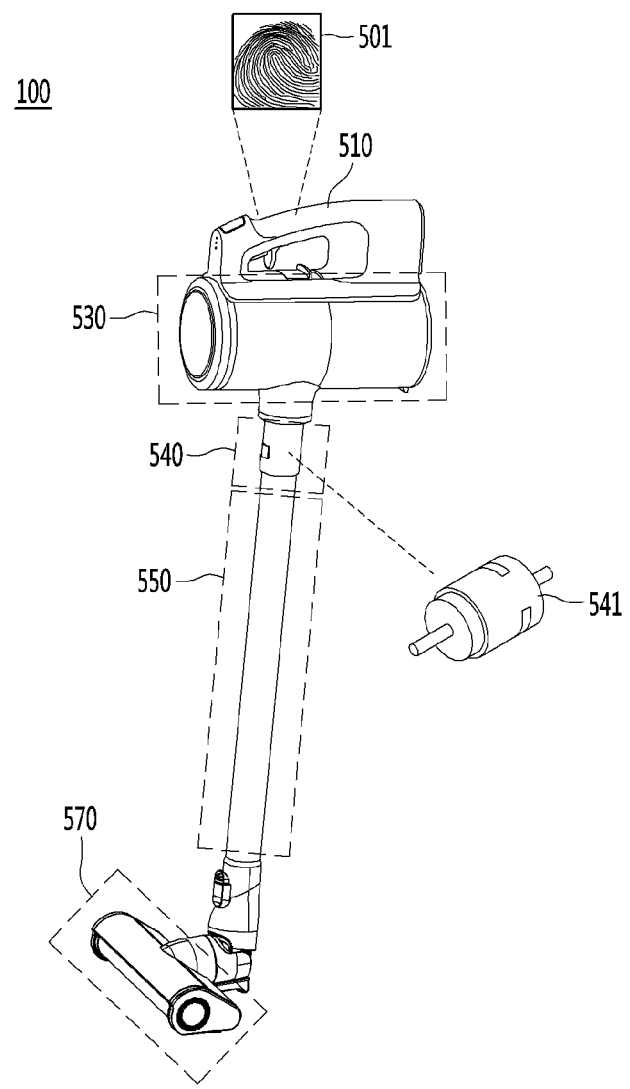
FIG. 5 is a view illustrating the configuration of a cleaner-type artificial intelligence device according to an embodiment of the present disclosure.

FIG. 5 is a view illustrating the configuration of a cleaner-type artificial intelligence device according to an embodiment of the present disclosure.

FIG. 5 is a view illustrating the configuration of a handy stick cleaner type artificial intelligence device 100.

The artificial intelligence device 100 may include a handle 510, a body 530, a head connector 540, a head 550 and a dust suction unit 570, in addition to the components of FIG. 4.

The handle 510 is a part of the artificial intelligence device 100 capable of being gripped by a user's hand.

The handle 510 may be provided with a fingerprint recognition sensor for identifying a user via the fingerprint data 501 of the user.

The body 530 may include all the components of FIG. 4.

The head connector 540 may be a member for connecting the body 530 with the head 550.

The head connector 540 may include a head motor 541 capable of increasing or decreasing the length of the head 550.

The head 550 connects the dust suction unit 570 with the body 530 and may extend downward from the body 530.

The length of the head 550 may be automatically or manually adjusted according to user information. To this end, the body 530 may include a head motor for adjusting the length of the head 550.

The length of the head 550 may be automatically adjusted by a length calculation model which will be described below.

The dust suction unit 570 may suck in the dust on a floor. To this end, the dust suction unit 570 may include a suction motor for sucking in air.

The dust suction unit 570 may be connected to an end of the head 550.

Figure 6:
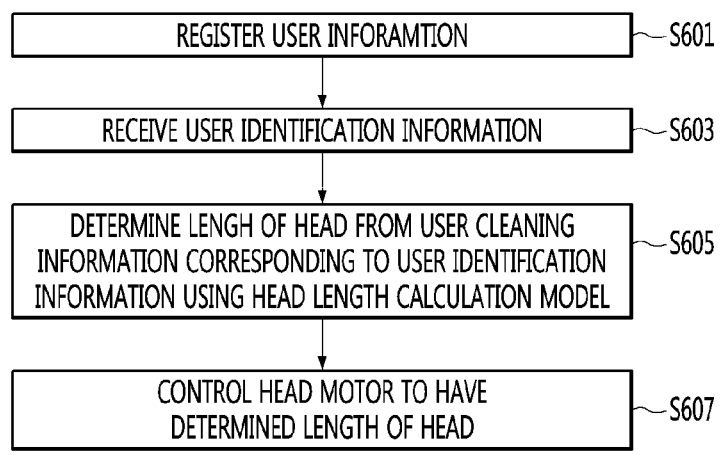
FIG. 6 is a view illustrating a method of operating an artificial intelligence device according to an embodiment of the present disclosure.

FIG. 6 is a view illustrating a method of operating an artificial intelligence device according to an embodiment of the present disclosure.

In particular, FIG. 6 is a view illustrating an embodiment in which user information is registered and the length of the head 550 is automatically adjusted according to information on the registered user.

The processor 180 of the artificial intelligence device 100 registers user information (S601).

The user information may include the height and gender of the user, user identification information, a pressure sensing value and the angle of the head 550.

The user identification information is to identify who the user is and may include one or more of the fingerprint of the user, the voice of the user and the name of the user.

The user may register the fingerprint or voice thereof in advance via the artificial intelligence device 100 for identifying the user.

The pressure sensing value may be a pressure value applied to the head 550 while the user performs cleaning via the artificial intelligence device 100. To this end, the head 550 may be provided with a pressure sensor.

The angle of the head 550 may indicate an angle between the ground or the dust suction unit 570 and the head 550 while the user performs cleaning via the artificial intelligence device 100.

To this end, the head 550 may be provided with an angle sensor.

The pressure sensing value and the angle of the head 550 may be measured by the artificial intelligence device 100.

Figure 7:
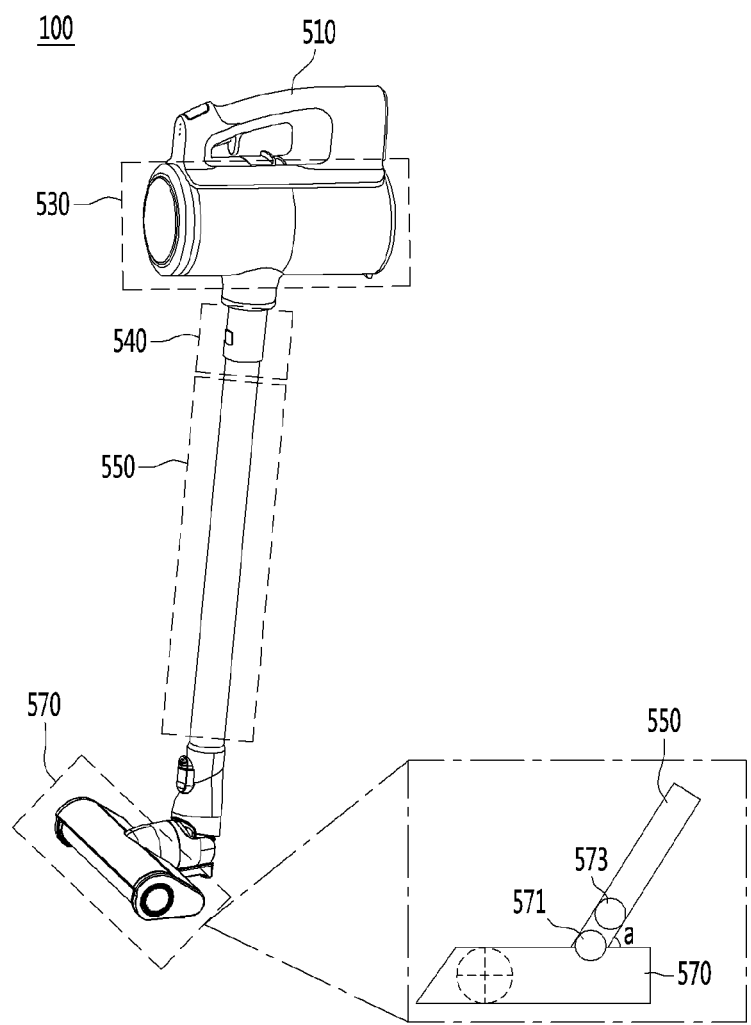
FIG. 7 is a view illustrating an example of measuring a pressure sensing value and the angle of a head according to an embodiment of the present disclosure.

FIG. 7 is a view illustrating an example of measuring a pressure sensing value and the angle of a head according to an embodiment of the present disclosure.

The head 550 may include a pressure sensor 571 and an angle sensor 573.

The pressure sensor 571 and the angle sensor 573 may be disposed at an end of the head 550 in which the dust suction unit 570 is in contact with the head 550.

The pressure sensor 571 may measure the pressure sensing value applied to the head 550 while the user performs cleaning.

The angle sensor 573 may measure a head angle a between the dust suction unit 570 or the ground and the head 550.

The pressure sensing value measured by the pressure sensor 571 and the angle measured by the angle sensor 573 may be used to set the length of the head 550 later.

The pressure sensing value and the angle sensed by the angle sensor 573, may be matched with the identification information of the user and stored in the memory 170.

If the length of the head 550 is shorter than the height of the user, the pressure sensing value is increased and the angle of the head is closer to the vertical than the ground.

In contrast, if the length of the head 550 is longer than the height of the user, the pressure sensing value may be decreased and the angle of the head may be less than that of the vertical.

The head length calculation model may refer to a model in which a correlation among the height of the user, the pressure sensing value, the head angle and the head length is learned.

FIG. 6 will be described again.

The processor 180 may receive the user information from an external device and store the received user information in the memory 170.

The external device may be a mobile terminal such as a smartphone of a user, but this is merely an example.

The external device may receive the user information from the user via a cleaner application installed therein.

The external device may transmit the received user information to the artificial intelligence device 100.

Figure 8:
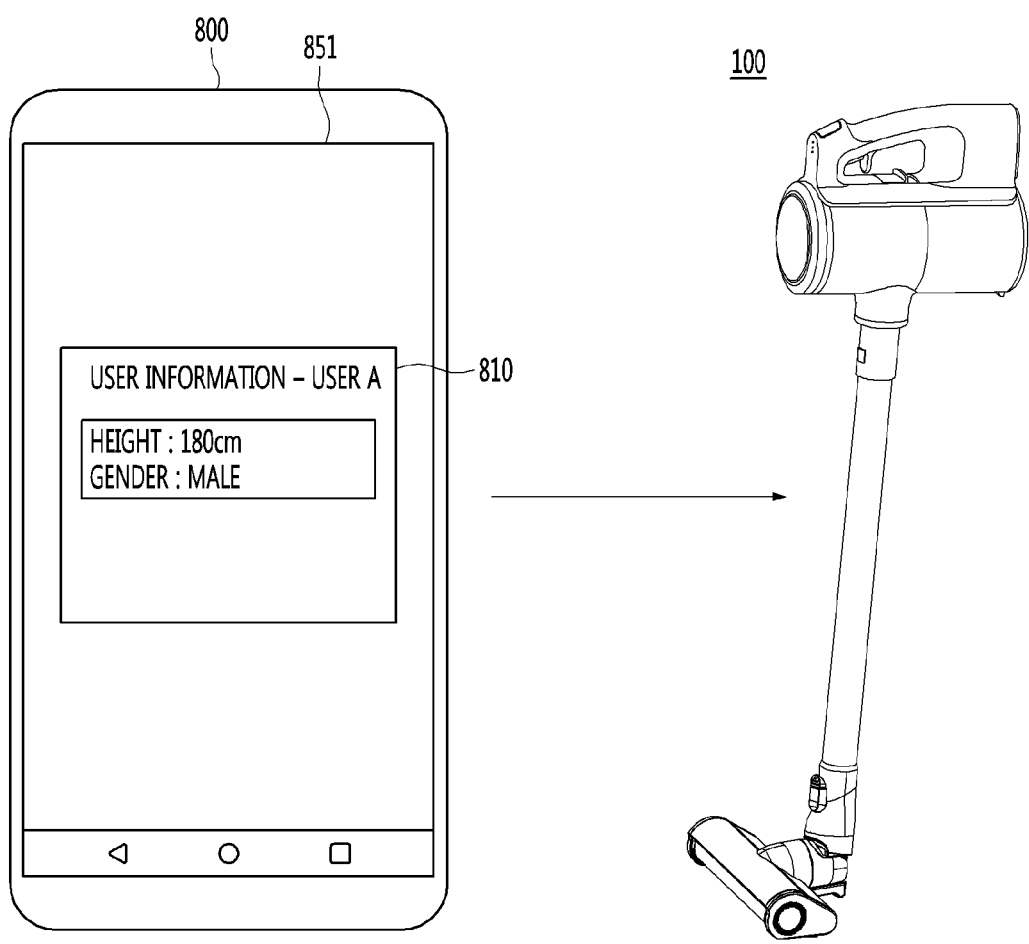
FIG. 8 is a view illustrating a process of inputting user information via an external device according to an embodiment of the present disclosure.

FIG. 8 is a view illustrating a process of inputting user information via an external device according to an embodiment of the present disclosure.

Referring to FIG. 8, the display 751 of an external device 700 may display an execution screen 710 of the cleaner application. The execution screen 710 of the cleaner application may be a screen for receiving one or more of the height and gender of the user.

The external device 700 may transmit the information on the height and gender of the user to the artificial intelligence device 100.

Information on the height and gender of the user transmitted from the external device 700 to the artificial intelligence device 100 may be transmitted before the user performs cleaning via the artificial intelligence device 100.

The artificial intelligence device 100 may match the information on the height and gender of the user received from the external device 700 with the user identification information, the pressure sensing value and the angle of the head 550 and store the information on the height and gender of the user in the memory 170.

FIG. 6 will be described again.

The processor 180 of the artificial intelligence device 100 receives the user identification information (S603), and determines the length of the head 550 from the user information corresponding to the user identification information using the head length calculation model (S605).

The head length calculation model may be an artificial neural network based model subjected to supervised learning by a deep learning algorithm or a machine learning algorithm.

The head length calculation model may be learned by the learning processor 130 of the artificial intelligence device 100 or the learning processor 240 of the AI server 200.

If the head length calculation model is learned by the learning processor 240 of the AI server 200, the artificial intelligence device 100 may receive the head length calculation model from the AI server 200 via a communication unit 110 (also referred to as a communication interface) and store the head length calculation model in the memory 170.

The head length calculation model may refer to a model for inferring the length of the head 550 optimized for the user from the height and gender of the user, the pressure sensing value and the angle of the head 550.

Here, the gender of the user may be an optional parameter. That is, information on the gender of the user may not be used in the learning process of the head length calculation model, and only the height of the user, the pressure sensing value and the angle of the head may be used for learning.

The head length calculation model may refer to a model which is composed of an artificial neural network and is learned to infer the length (or the length range) of the head 550 indicating a feature point (or an output feature point) using the height and gender of the user for learning, the pressure sensing value and the angle of the head 550 as input data.

The head length calculation model may be learned via supervised learning. This will be described with reference to the following drawings.

Figures 9, 10:
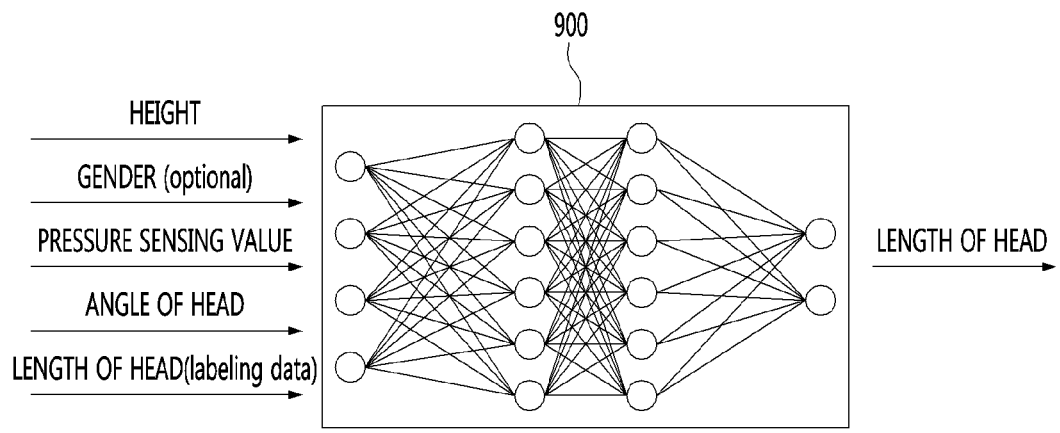
FIG. 9 is a view illustrating a supervised learning process of a head length calculation model based on an artificial neural network according to an embodiment of the present disclosure.
FIG. 10 is a view illustrating a training data set for learning of a head length calculation model.

FIG. 9 is a view illustrating a supervised learning process of a head length calculation model based on an artificial neural network according to an embodiment of the present disclosure, and FIG. 10 is a view illustrating a training data set for learning of a head length calculation model.

Referring to FIG. 9, the head length calculation model 900 may be learned with the goal of accurately inferring the labeled length of the head 550 from user cleaning information including the height and gender of the user, the pressure sensing value and the angle of the head 550.

The user cleaning information indicating training data may be labeled with the length (or the length range) of the head 550 and the head length calculation model 900 may be learned using the labeled training data.

Referring to FIG. 10, a plurality of training data sets including the user cleaning information including the height and gender of the user the pressure sensing value and the angle of the head 550 and the length of the head 550 labeled in the user cleaning information is shown.

The head length calculation model 900 may be subjected to supervised learning using the plurality of training data sets.

The loss function or cost function of the head length calculation model 900 may be expressed by a square mean of a difference between the label indicating the length of the head 550 corresponding to each training data and the length of the head 550 inferred from each training data.

In addition, the head length calculation model 900 may determine model parameters included in the artificial neural network to minimize the cost function via learning.

When an input feature vector is extracted from the user cleaning information for learning and is input, a result of determining the length of the head 550 may be output as a target feature vector, and the head length calculation model 900 may be learned to minimize the loss function corresponding to the difference between the output target feature vector and the labeled length of the head 550.

FIG. 6 will be described again.

The processor 180 may extract the user cleaning information including the height and gender of the user, the pressure sensing value and the angle of the head matching the user identification information from the memory 170, after receiving the user identification information via fingerprint recognition.

The processor 180 may determine the length of the head 550 from the extracted user cleaning information using the head length calculation model 900.

The determined length of the head 550 may be matched with the user identification information and stored in the memory 170. When the user inputs, to the artificial intelligence device 100, the user identification information later, the length of the head 550 may be automatically adjusted to a length matching the user identification information.

In FIG. 6, assume that the pressure sensing value and the angle of the head corresponding to the user identification information is acquired in advance in a previous cleaning process.

However, the present disclosure is not limited thereto and the pressure sensing value and the angle of the head may be acquired in a current cleaning process and, based on this, the length of the head 550 may be determined in real time.

The processor 180 of the artificial intelligence device 100 controls the head motor 541 to have the determined length of the head 550 (S607).

The processor 180 may control the head motor 541 to have the determined length of the head 550 via the head length calculation model 900.

That is, the processor 180 may transmit a control command (or current) for increasing or decreasing the length of the head 550 to the head motor 541.

According to the embodiment of the present disclosure, the height of the cleaner required by the user may be automatically controlled, thereby obtaining a user-friendly cleaner capable of being easily used.

FIG. 11 is a flowchart illustrating a method of operating an artificial intelligence device according to another embodiment of the present disclosure.

In particular, FIG. 11 is a view illustrating an embodiment in which, when the user uses the artificial intelligence device 100 in a state in which the head length calculation model 900 is installed in the artificial intelligence device 100, the length of the head 550 is automatically adjusted based on the measured pressure sensing value and the angle of the head.

Referring to FIG. 11, the processor 180 of the artificial intelligence device 100 receives the user identification information (S1101).

In one embodiment, the user identification information may be fingerprint data indicating the fingerprint of the user.

In another example, the user identification information may be voice data indicating the voice of the user.

The user identification information may include a variety of information capable of identifying the user, such as face image data indicating the face of the user, iris data, etc.

The processor 180 may compare the received user identification information with the user identification information stored in the memory 170 to search for matching identification information.

The processor 180 may extract the height and gender of the user corresponding to the matching user identification information from the memory 170. That is, the height and gender of the user matching the user identification information may be stored in the memory 170.

Thereafter, the processor 180 of the artificial intelligence device 100 measures the pressure sensing value applied to the head 550 and the head angle (S1103).

The processor 180 may measure pressure applied to the head 550 via the pressure sensor 571, after identifying the user via the user identification information. Simultaneously, the processor 180 may measure the head angle between the head 550 and the ground or between the head 550 and the dust suction unit 570 via the angle sensor 573.

The processor 180 of the artificial intelligence device 100 determines the length of the head 550 from the user cleaning information corresponding to the user identification information using the head length calculation model 900 (S1105).

The processor 180 may acquire user cleaning information including the height and gender of the user corresponding to the user identification information and the pressure sensing value and head angle measured in step S1103.

The processor 180 may determine the length of the head 550 from the user cleaning information using the head length calculation model 900.

The processor 180 may determine the determined length of the head 550 as the length optimized for the identified user.

For the detailed description of the head length calculation model 900, refer to the description of FIGS. 9 and 10.

The processor 180 of the artificial intelligence device 100 controls the head motor 541 to have the determined length of the head 550 (S1107).

Thereafter, the user may perform cleaning using the head 550 having the adjusted length.

According to the embodiment of the present disclosure, it is possible to provide the head 550 adjusted to have the length optimized for the user using the pre-learned head length calculation model 900.

Therefore, it is possible to greatly improve the cleaning convenience of the user.

Meanwhile, when the length of the head 550 is readjusted by the user in a state of being adjusted to the determined length of the head 550, the processor 180 may update the head length calculation model 900 using the height of the user, the pressure sensing value, the head angle and the readjusted length of the head 550.

FIG. 12 is a view illustrating a head length table in which head lengths respectively match a plurality of users.

The head length table 1200 may refer to a table in which optimized head lengths respectively matching a plurality of users are stored.

Each head length may be obtained based on the head length calculation model 900.

The head length table 1200 may be stored in the memory 170. When the user identification information is received, the artificial intelligence device 100 may extract the head length corresponding to the user identification information and adjust the height of the head 550 to the extracted head length.

For example, the artificial intelligence device 100 may adjust the length of the head 550 to 30 cm when User A is identified, adjust the length of the head 550 to 25 cm when User B is identified, and adjust the length of the head 550 to 50 cm when User C is identified.

According to the embodiment of the present disclosure, when the user is identified, it is possible to control the height of the head 550 to have an appropriate length via the head length table 1200.

Figure 13:
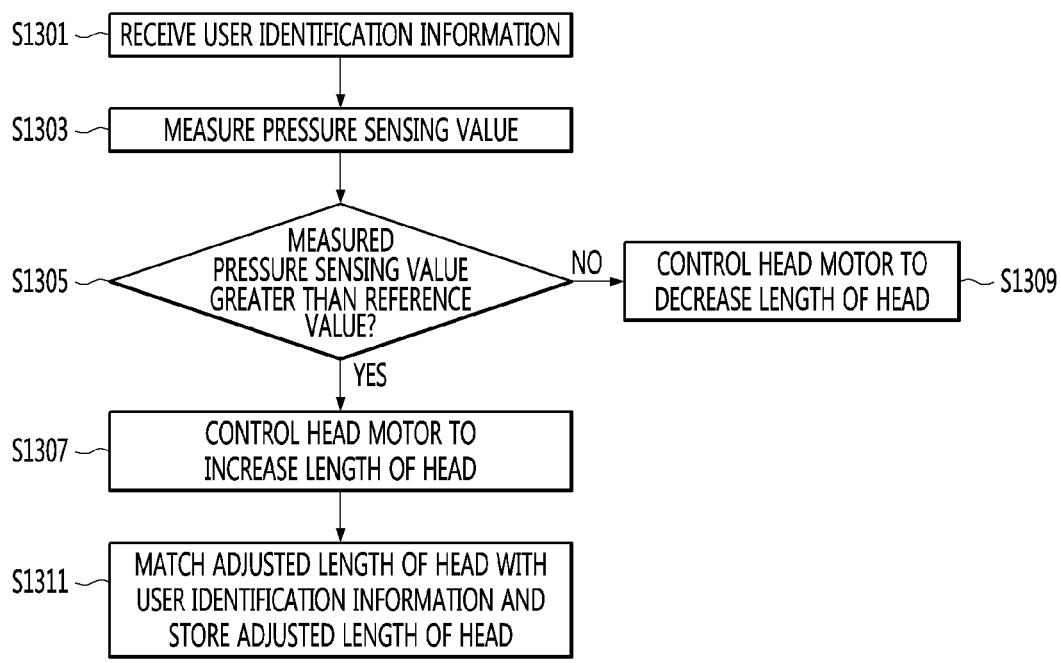
FIG. 13 is a flowchart illustrating a method of operating an artificial intelligence device according to another embodiment of the present disclosure.

FIG. 13 is a flowchart illustrating a method of operating an artificial intelligence device according to another embodiment of the present disclosure.

In particular, FIG. 13 is a view illustrating an embodiment in which the length of the head 550 is automatically adjusted based on the pressure sensing value, when the user does not input the height of the user via an application.

Referring to FIG. 13, the processor 180 of the artificial intelligence device 100 receives user identification information (S1301).

The user identification information may include one or more of fingerprint data indicating the fingerprint of the user or voice data indicating the voice of the user.

The processor 180 of the artificial intelligence device 100 measures the pressure sensing value applied to the head 550 via the pressure sensor 571 (S1303).

Step S1303 may be performed after the user starts cleaning via the artificial intelligence device 100.

The processor 180 of the artificial intelligence device 100 determines whether the measured pressure sensing value is greater than a reference value (S1305).

The reference value may be a threshold value used to adjust the length of the head 550.

If the length of the head 550 is shorter than the height of the user, the pressure sensing value may increase, and, if the length of the head 550 is longer than the height of the user, the pressure sensing value may decrease.

When the measured pressure sensing value is greater than the reference value, the processor 180 of the artificial intelligence device 100 controls the head motor 541 to increase the length of the head 550 (S1307).

When the measured pressure sensing value is less than the reference value, the processor 180 of the artificial intelligence device 100 controls the head motor 541 to decrease the length of the head 550 (S1309).

That is, even if the height information of the user is not known, the processor 180 may adjust the length of the head 550 to be appropriate to the user using the pressure sensing value applied to the head 550. Therefore, it is possible to greatly improve cleaning convenience of the user.

Thereafter, the processor 180 of the artificial intelligence device 100 matches the adjusted length of the head 550 with the user identification information and stores the adjusted length of the head 550 in the memory 170 (S1311).

The processor 180 may match the adjusted length of the head 550 with the user identification information and store the adjusted length of the head 550 in the memory 170, as in the head length table 1200 shown in FIG. 12.

The processor 180 may automatically adjust the length of the head 550 to the length value of the head 550 appropriate to the identified user using the head length table 1200 later.

Therefore, since the user does not need to manually adjust the length of the head, it is possible to improve convenience.

According to the embodiment of the present disclosure, the height of the cleaner required by the user may be automatically controlled, thereby obtaining a user-friendly cleaner capable of being easily used.

According to the embodiment of the present disclosure, since the user does not need to manually adjust the length of the head, it is possible to greatly improve convenience.

The present disclosure may also be embodied as computer readable codes on a medium having a program recorded thereon. The computer readable medium is any data storage device that may store data which may be thereafter read by a computer system. Examples of the computer readable medium include HDD (Hard Disk Drive), SSD (Solid State Disk), SDD (Silicon Disk Drive), ROM, RAM, CD-ROM, a magnetic tape, a floppy disk, an optical data storage device, or the like. In addition, the computer may include the processor 180 of the AI device.

What is claimed is:

1. An artificial intelligence (AI) cleaner comprising:
a head;
a head motor configured to adjust a length of the head;
a memory configured to store a head length calculation model;
a pressure sensor configured to measure a pressure sensing value applied to the head;
an angle sensor configured to measure a head angle between the head and a ground; and
a processor configured to:
determine the length of the head from user cleaning information including a height of a user, the measured pressure sensing value and the head angle, using the head length calculation model, and
control the head motor to have the determined length of the head.

2. The AI cleaner of claim 1, further comprising a fingerprint recognition sensor,
wherein the user identification information includes fingerprint data of a user, and
wherein the processor identifies the user via the fingerprint recognition sensor.

3. The AI cleaner of claim 1,
wherein the head length calculation model is an artificial neural network based model learned via a deep learning algorithm or a machine learning algorithm, and
wherein the head length calculation model is subjected to supervised learning using a training data set including user cleaning information for learning including a length of a user for learning, a pressure sensing value for learning and a head angle for learning and a length of a head labeled in the user cleaning information for learning.

4. The AI cleaner of claim 3,
wherein the head length calculation model infers the length of the head appropriate to a user from the user cleaning information.

5. The AI cleaner of claim 4, wherein the processor is configured to:
receive the user identification information and acquire a height of a user corresponding to the received user identification information,
measure the pressure sensing value via the pressure sensor,
measure the head angle via the angle sensor, and
acquire the length of the head as output data using the acquired height, the measured pressure sensing value and the measured head angle as input data of the head length calculation model.

6. The AI cleaner of claim 5, wherein the processor is configured to match the acquired length of the head with the user identification information and store the acquired length of the head in the memory.

7. The AI cleaner of claim 6, wherein the memory is configured to store a plurality of head lengths respectively matching a plurality of users.

8. The AI cleaner of claim 3, wherein the user cleaning information for learning further includes a gender of a user.

9. A method of operating an artificial intelligence (AI) cleaner including a head and a head motor configured to adjust a length of the head, the method comprising:
receiving user identification information;
acquiring height data of a user matching the received user identification information;
determining the length of the head from user cleaning information including the height data of the user, a measured pressure sensing value and a head angle using a head length calculation model; and
controlling the head motor to have the determined length of the head.

10. The method of claim 9,
wherein the AI cleaner further includes a fingerprint recognition sensor,
wherein the user identification information includes fingerprint data of a user, and
wherein the method further includes identifying the user via the fingerprint recognition sensor.

11. The method of claim 9,
wherein the head length calculation model is an artificial neural network based model learned via a deep learning algorithm or a machine learning algorithm, and
wherein the head length calculation model is subjected to supervised learning using a training data set including user cleaning information for learning including a length of a user for learning, a pressure sensing value for learning and a head angle for learning and a length of a head labeled in the user cleaning information for learning.

12. The method of claim 11,
wherein the head length calculation model infers a length of the head appropriate to a user from the user cleaning information.

13. The method of claim 12, further comprising:
measuring the pressure sensing value via a pressure sensor,
measuring the head angle via an angle sensor, and
wherein the determining includes acquiring the length of the head as output data using the acquired height, the measured pressure sensing value and the measured head angle as input data of the head length calculation model.

14. The method of claim 13, further comprising matching the acquired length of the head with the user identification information and storing the acquired length of the head in a memory.

15. The method of claim 14, wherein the memory stores a plurality of head lengths respectively matching a plurality of users.

16. The method of claim 11, wherein the user cleaning information for learning further includes a gender of a user.

\* \* \* \* \*